United States Patent
Lee et al.

(10) Patent No.: US 8,588,215 B2
(45) Date of Patent: Nov. 19, 2013

(54) PROXY SERVER, COMPUTER PROGRAM PRODUCT AND METHODS FOR PROVIDING A PLURALITY OF INTERNET TELEPHONY SERVICES

(75) Inventors: Shu-Liang Lee, Hsinchu (TW); Nuan-Yu Yang, Taipei (TW); Hsi-Feng Chen, Bade (TW); Wei-Chiang Peng, Zhongli (TW)

(73) Assignee: MediaTek Inc., Hsin-Chu (TW)

( * ) Notice: Subject to any disclaimer, the term of this patent is extended or adjusted under 35 U.S.C. 154(b) by 338 days.

(21) Appl. No.: 13/013,572

(22) Filed: Jan. 25, 2011

(65) Prior Publication Data
US 2011/0182284 A1    Jul. 28, 2011

Related U.S. Application Data

(60) Provisional application No. 61/298,623, filed on Jan. 27, 2010.

(51) Int. Cl.
| H04L 12/66 | (2006.01) |
| H04L 12/28 | (2006.01) |
| H04J 3/16  | (2006.01) |
| G06F 15/16 | (2006.01) |

(52) U.S. Cl.
USPC ........... 370/352; 370/392; 370/401; 370/465; 709/227

(58) Field of Classification Search
USPC ............ 370/352, 389, 392, 401, 328, 465; 709/227, 228
See application file for complete search history.

(56) References Cited

U.S. PATENT DOCUMENTS

| 7,539,494 | B2 * | 5/2009  | Idnani et al. .............. 455/445 |
| 7,697,127 | B2 * | 4/2010  | Vogel et al. ............... 356/154 |
| 8,036,104 | B2 * | 10/2011 | Corson et al. ............. 370/217 |
| 8,279,798 | B2 * | 10/2012 | Preiss et al. .............. 370/328 |
| 2001/0056550 | A1 | 12/2001 | Lee |
| 2003/0161300 | A1 * | 8/2003 | Malik .................... 370/352 |
| 2005/0282543 | A1 * | 12/2005 | Idnani et al. ........... 455/432.1 |
| 2006/0109703 | A1 * | 5/2006 | Nishihara ................ 365/145 |

(Continued)

FOREIGN PATENT DOCUMENTS

| CN | 1509564    | 6/2004 |
| CN | 101442476  | 5/2009 |

OTHER PUBLICATIONS

English language translation of abstract of CN 1509564 (published Jun. 30, 2004).

(Continued)

Primary Examiner — Andrew Lee
(74) Attorney, Agent, or Firm — McClure, Qualey & Rodack, LLP

(57) ABSTRACT

A proxy server including a system manager and a database is provided. The system manager includes an internal registrar module, an external registrar module, a session manager module and a signal routing module. The internal registrar module provides an internal register service for a plurality of nodes in a first service network. The external registrar module registers at an internet service provider providing network services in a second service network. The session manager module manages session processes in the first service network and the second service network and manages the network services shared between the registered nodes. The signal routing module routes control signals of the session processes between the first service network and the second service network. The database stores information related to the registered nodes.

22 Claims, 6 Drawing Sheets

(56) References Cited

U.S. PATENT DOCUMENTS

2008/0049735 A1* 2/2008 Kikinis et al. ............... 370/352
2009/0133517 A1* 5/2009 Kamara et al. ............... 74/10.29
2010/0316199 A1* 12/2010 Martin, II .................. 379/88.08

OTHER PUBLICATIONS

English language translation of abstract CN 101442476 (published May 27, 2009).

* cited by examiner

PROXY SERVER, COMPUTER PROGRAM PRODUCT AND METHODS FOR PROVIDING A PLURALITY OF INTERNET TELEPHONY SERVICES

CROSS REFERENCE TO RELATED APPLICATIONS

This application claims the benefit of U.S. Provisional Application No. 61/298,623 filed Jan. 27, 2010 and entitled "MECHANISM FOR SHARING AN EXTERNAL ACCOUNT AND REDUCING THE COST OF COMMUNICATION". The entire contents of which are hereby incorporated by reference.

BACKGROUND OF THE INVENTION

1. Field of the Invention

The invention relates to a mechanism for providing extends internet telephony sharing services, and more particularly to a mechanism for the bandwidth saving.

2. Description of the Related Art

Voice over Internet Protocol (VoIP) is a general term for a family of transmission technologies for delivery of voice communications over IP networks such as the Internet or other packet-switched networks. Other terms frequently encountered and synonymous with VoIP are IP telephony, Internet telephony, voice over broadband (VoBB), broadband telephony, and broadband phone.

Internet telephony, which is a cost efficient technological method of transporting digitalized media data, refers to communications services—voice, video, facsimile, and/or media-messaging applications—that are transported via the Internet, rather than the public switched telephone network (PSTN). The basic steps involved in an Internet telephone call are conversion of an analog media data to a digital format and compression/translation of the signal, packed into Internet protocol (IP) packets for transmission over the Internet, wherein the process is reversed at the receiving end.

Because Internet telephony is widely used nowadays, it is desired to develop a mechanism to further expand the services provided by Internet telephony technology, and improve quality of service of Internet telephony.

BRIEF SUMMARY OF THE INVENTION

Proxy servers, computer program products and methods for providing a plurality of internet telephony services by a proxy server connected between a first service network and a second service network are provided. An embodiment of a proxy server connected between a first service network and a second service network comprises a system manager and a database. The system manager comprises an internal registrar module, an external registrar module, a session manager module and a signal routing module. The internal registrar module is arranged to provide an internal register service for a plurality of nodes in the first service network. An internal account is assigned to each registered node. The external registrar module is arranged to register at an internet service provider (ISP) providing a plurality of network services in the second service network. An external account is obtained from the ISP. The session manager module is arranged to manage a plurality of session processes in the first service network and the second service network and manage the network services shared between the registered nodes. The signal routing module is arranged to route a plurality of control signals of the session processes between the first service network and the second service network. The database is arranged to store information related to the registered nodes.

An embodiment of a computer program product comprises a non-transitory computer readable medium having a plurality of computer readable program codes embedded thereon for providing a plurality of proxy server services between a first service network and a second service network. The computer readable program codes comprises: computer readable program codes for providing an internal register service for a plurality of nodes in the first service network; computer readable program codes for assigning an internal account to each registered node; computer readable program codes for registering with an internet service provider (ISP) providing a plurality of network services in the second service network, to thereby obtain an external account from the ISP thereafter; computer readable program codes for managing the network services to be shared between the registered nodes; computer readable program codes for managing a plurality of session processes in the first service network and the second service network; and computer readable program codes for routing a plurality of control signals of the session processes between the first service network and the second service network.

Another embodiment of a method for providing a plurality of internet telephony services by a proxy server connected between a first service network and a second service network comprising: receiving one or more register requests from one or more nodes in the first service network to register to the proxy server; processing an internal account register in response to the register requests and assigning an internal account to each registered node; transmitting an external register message for the proxy server to register at an internet service provider (ISP) providing a plurality of network services in the second service network, and obtaining an external account from the ISP after registering with the ISP; receiving one or more network service requests from the registered nodes for using the network services provided by the ISP; managing the internal accounts so as to share the network services between the registered nodes; managing a plurality of session processes in the first service network and the second service network so as to provide the network services to the requesting registered nodes; and routing a plurality of control signals of the session processes between the first service network and the second service network.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
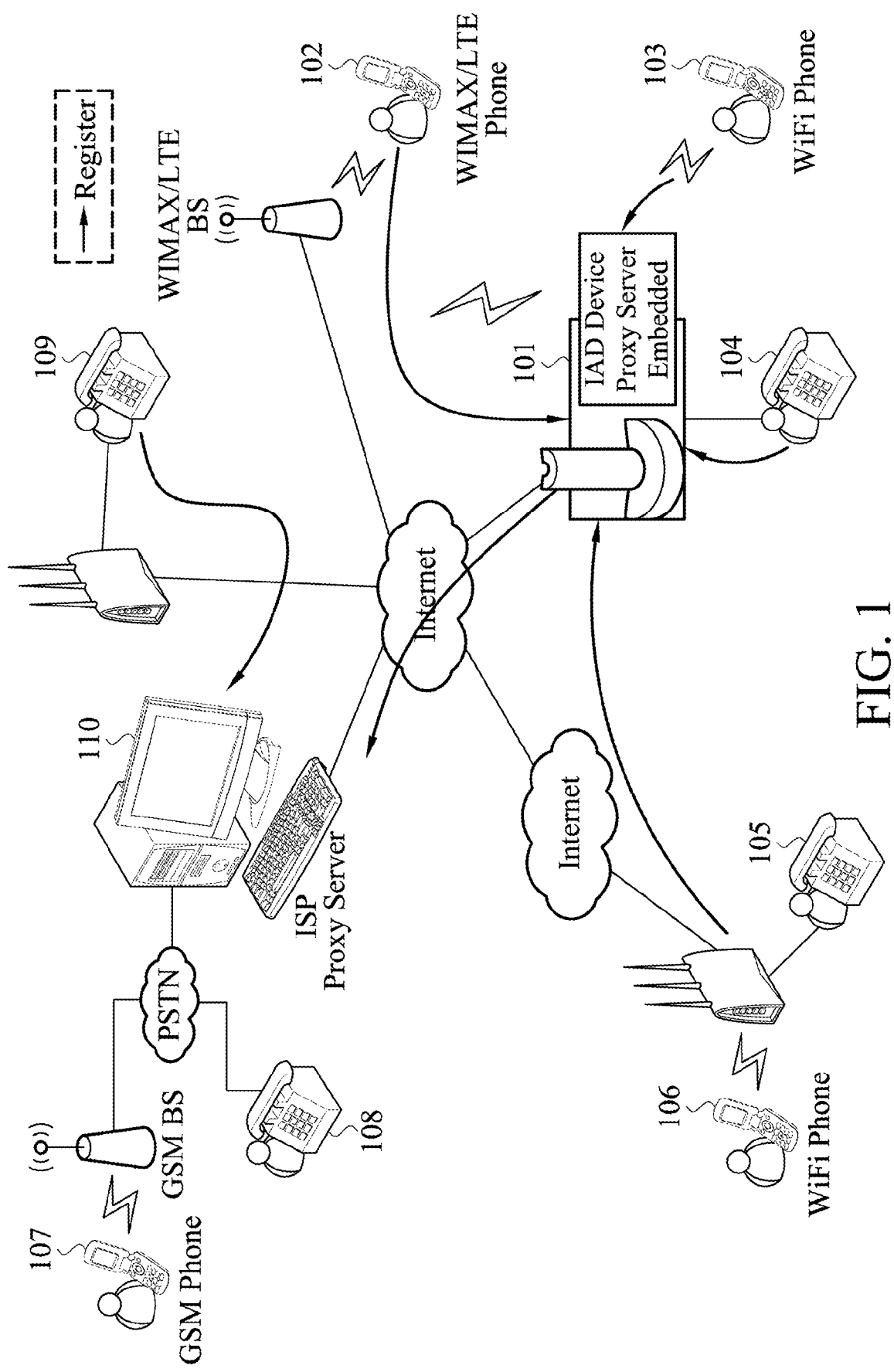
FIG. 1 shows an exemplary network topology according to an embodiment of the invention.

FIG. 1 shows an exemplary network topology according to an embodiment of the invention. According to the embodiment of the invention, an IAD (internet access device) 101 with proxy server embedded therein in the network is developed to provide a plurality of expanded internet telephony services with improved quality of service (for example, bandwidth saving). As shown in FIG. 1, there are a plurality of nodes in the network, such as the Wimax/LTE phone 102, the WiFi phones 103 and 106, the GSM phone 107 and the PSTN telephones 104, 105, 108 and 109 nodes. In the embodiments of the invention, one or more nodes may register at the IAD 101 (as indicated by the arrows in FIG. 1), such as the Wimax/LTE phone 102, the WiFi phones 103 and 106 and the telephones 104 and 105 nodes. The registered nodes may form an internal network (i.e. a first service network). A plurality of internal communication services may be provided by the IAD 101 so that the registered nodes are capable of communicating with each other. The internal communication services provided by the IAD 101 may be free of charge and without bandwidth limitations (or may utilize a very large bandwidth). In addition, according to the embodiment of the invention, the registered nodes may also be capable of using the network services provided by an internet service provider (ISP) via the IAD 101, without directly registering with the ISP. The ISP, such as the ISP proxy server 110 shown in FIG. 1, may be located in a second service network different from the first service network to provide a plurality of network services in the second service network. In this manner, not all of the nodes in the network have to register at the ISP, and the network services provided by the ISP may be shared between the nodes via the IAD 101 connected between the first service network and the second service network. According to the embodiments of the invention, the first service network and the second service network may include any type of network, such as a local area network (LAN), wide area network (WAN), an internet, an Ethernet, a public switch telephone network (PSTN), a cellular phone network, a Wimax/LTE network, a WiFi network, or the likes as shown in FIG. 1. More detailed descriptions for the apparatus and method implementing the above-mentioned mechanism are given in the following paragraphs.

Figure 2:
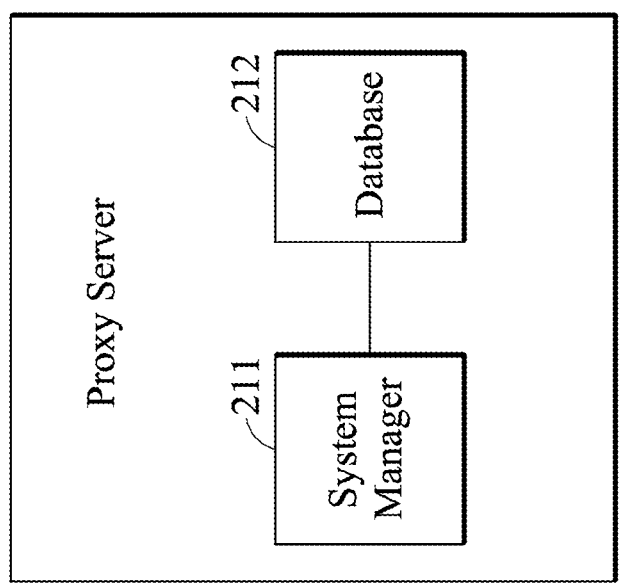
FIG. 2 shows a block diagram of an IAD with proxy server embedded therein according to an embodiment of the invention.

FIG. 2 shows a block diagram of an IAD with proxy server embedded therein according to an embodiment of the invention. In the embodiments of the invention, the proxy server may act as an intermediary for translating various request of service on a different service network. For example, the proxy server may provide registrar services, call signal routing/translation, session management, and media trans-coding service. According to an embodiment of the invention, the proxy server may further have the capability to register to others' ISP service provider server, and let all the registered clients, share the ISP service. As shown in FIG. 2, the proxy server may comprise at least a system manager 211 and a database 212. The system manager 211 processes the data and control signals routed between the connected networks and the database 212 stores necessary system data and client information of the registered nodes so as to provide the above-mentioned expanded internet telephony services therebetween. According to another aspect of the invention, the services provided by the proxy server may also be implemented by a computer program product. The computer program product may comprise a non-transitory computer readable medium, such as a memory device, having computer readable program codes embedded thereon for providing the proxy server services between different networks. Therefore, the concept of the invention may be carried out by any hardware, firmware, and/or software structure, or any combinations thereof, and the invention should not be limited thereto.

Figure 3:
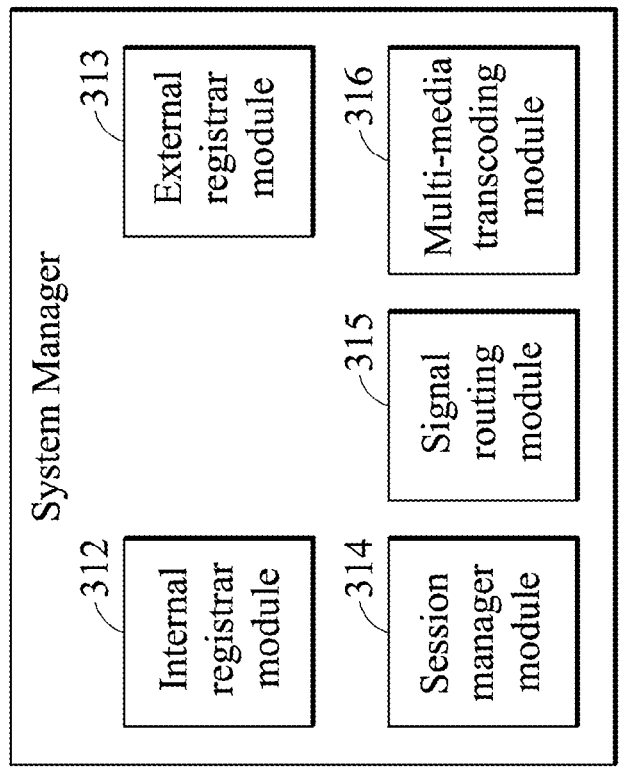
FIG. 3 shows a block diagram of a system manager according to an embodiment of the invention.

FIG. 3 shows a block diagram of a system manager according to an embodiment of the invention. System manager 311 comprises an internal registrar module 312, an external registrar module 313, a session manager module 314, a signal routing module 315 and a multi-media transcoding module 316. The internal registrar module 312 is arranged to provide the internal register service for the nodes in the network. According to an embodiment of the invention, an internal account is assigned to each registered node after registration. The external registrar module 313 is arranged to register at one or more ISP(s), such as the ISP proxy server 110 shown in FIG. 1. After registering with the ISP, the ISP may assign an external account for the proxy server (e.g. the IAD 101 or 201) so that the IAD 101 or 201 may use the network services provided by the ISP. The session manager module 314 is arranged to manage a plurality of session processes in the networks where the proxy server is connected to, and manage the network services provided by the ISP so as to share the network services between the registered nodes. The signal routing module 315 is arranged to route the control signals of the session processes between the networks. A multi-media transcoding module 316 is arranged to perform transcoding, between different coding schemes, such as transcoding, from a first coding scheme to a second coding scheme or from the second coding scheme to the first coding scheme, where the first coding scheme may be the coding scheme adopted by any registered node to encode multi-media data in the network, where the registered node is located, and the second coding scheme may be the coding scheme adopted by the ISP or any target node in the network, where the ISP or target node is located, to encode multi-media data.

Figure 4:
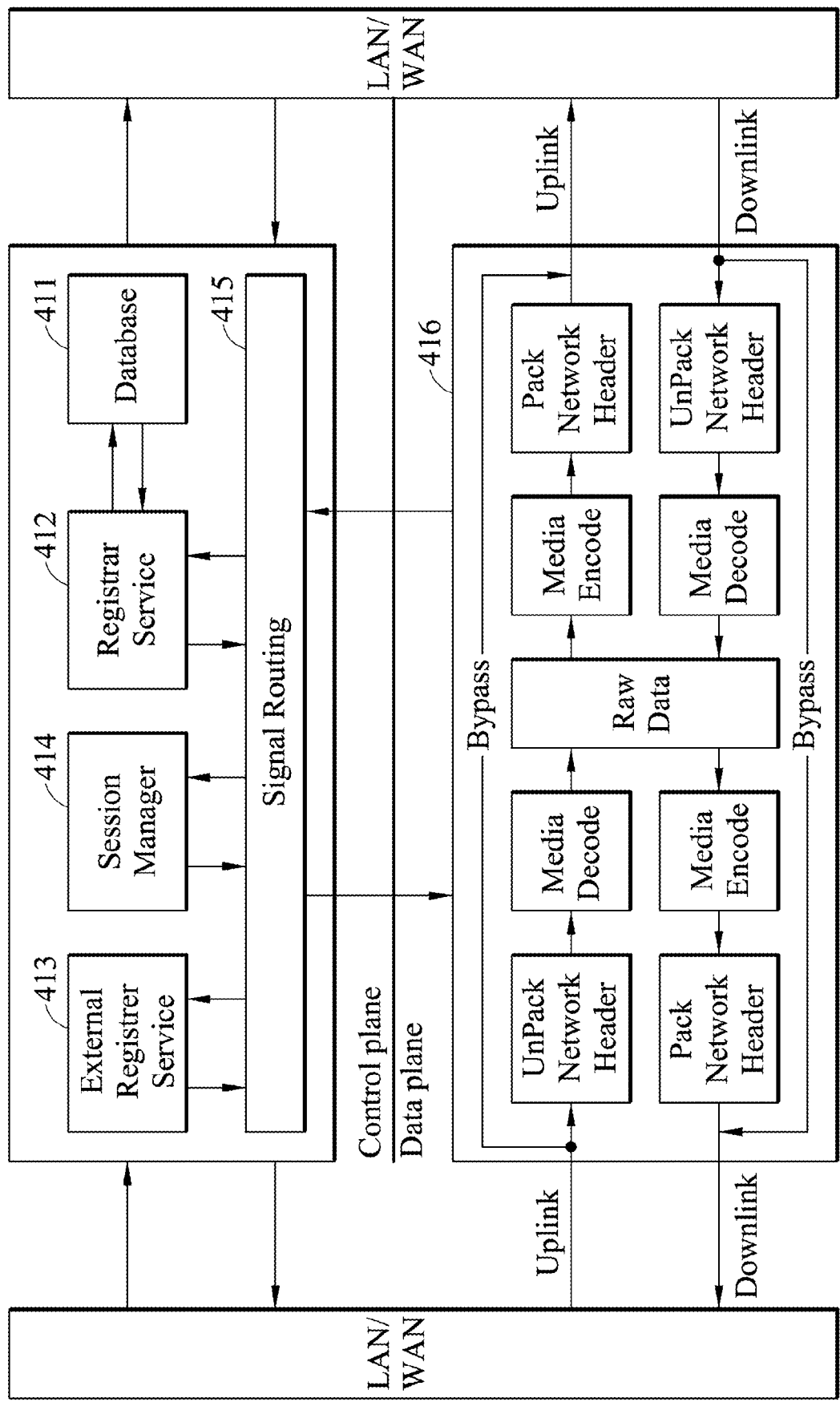
FIG. 4 is a block diagram showing the signal and data flow in the proxy server according to an embodiment of the invention.

FIG. 4 is a block diagram showing the signal and data flow in the proxy server according to an embodiment of the invention. As shown in FIG. 4, the database 411, the registrar service 412, the external registrar service 413, the session manager 414 and the signal routing 415 are configured in the control plane, and the multi-media transcoding module 416 is configured in the data plane. Detailed descriptions of the operation of the registrar service 412, the external registrar service 413, the session manager 414, the signal routing 415, and the multi-media transcoding module 416, are omitted here for brevity, as reference may be made to the internal registrar module 312, the external registrar module 313, the session manager module 314, the signal routing module 315, and multi-media transcoding module 316 of FIG. 3. Note that the blocks of modules shown in FIG. 3 and FIG. 4 may also be implemented by corresponding computer readable program codes or carried out by any hardware, firmware, and/or software structure, or any combinations thereof, and the invention should not be limited thereto. For example, the corresponding hardware, firmware, and/or software structures should not be limited to be implemented in any integrated access device (IAD) that is capable of connecting to the network, such as a gateway, a router, a telephone, a cell phone, or the likes.

Figure 5:
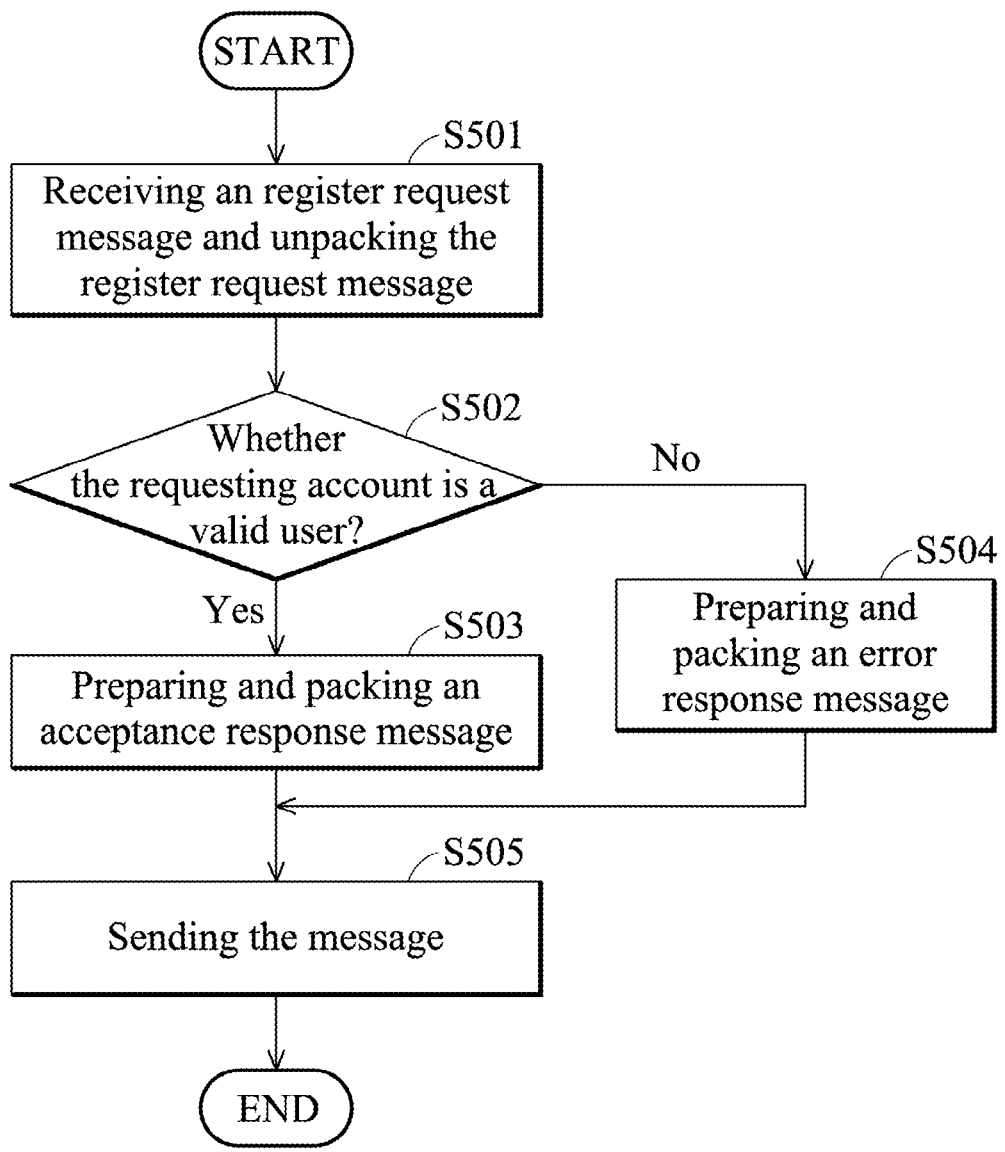
FIG. 5 shows a flow chart of a method for internal account registration according to an embodiment of the invention.

FIG. 5 shows a flow chart of a method for internal account registration according to an embodiment of the invention. After receiving a register request message from any node in the network to register to the proxy server and unpacking the register request message (Step S501), the internal registrar module may first determine whether the requesting account is a valid user (Step S502). The determination may be made by checking the record stored in the database 411. For example, the internal registrar module may check whether the requesting node has already paid the basic fee charged by the proxy server for using the expanded internet telephony services. When the requesting node is a valid user, the internal registrar module may prepare an acceptance response message and pack the acceptance response message according to the format recognized by the requesting node (Step S503), and send the message to the requesting node (Step S505). When the requesting node is not a valid user, the internal registrar module may prepare an error response message and pack the error response message according to the format recognized by the requesting node (Step S504), and send the message to the requesting node (Step S505). The message may be routed by the signal routing module (e.g. the signal routing module 315) to the requesting node. After completing the internal account registration process for a valid user, an internal account is assigned to the registered node.

Figure 6:
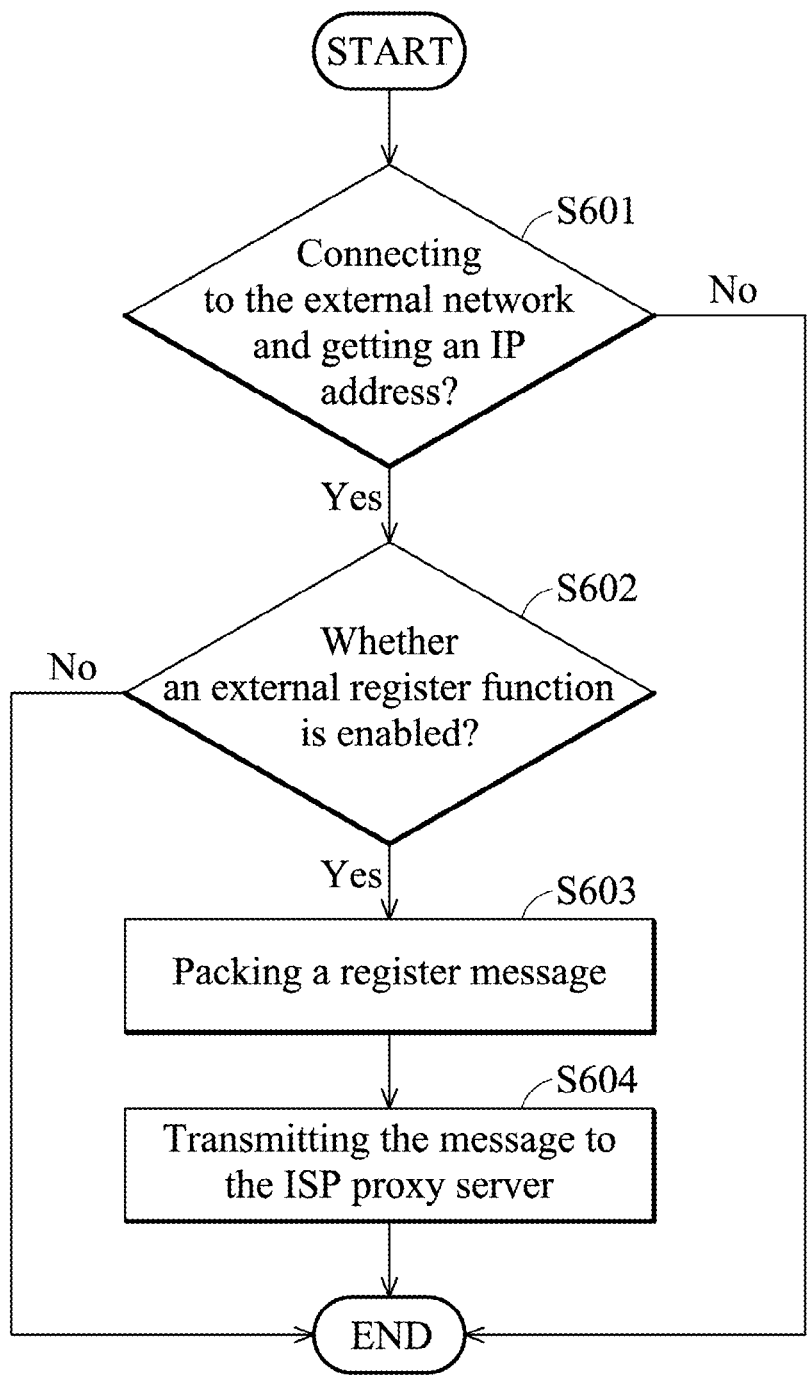
FIG. 6 shows a flow chart of a method for external account registration according to an embodiment of the invention.

FIG. 6 shows a flow chart of a method for external account registration according to an embodiment of the invention. The external registrar module may first check whether the proxy server is connected to the external network and has an internet protocol (IP) address (Step S601). When the proxy server has connected to the external network and has an IP address, the external registrar module may further check whether an external register function is enabled (Step S602). For example, the external register function may be enabled or disabled according to different system requirements and the external registrar module may check a setting value in the database 411 to determine whether the external register function is enabled. When the external register function is enabled, the external registrar module may pack a register message according to the message format required by the target ISP proxy server (Step S603) and transmit the message to the ISP proxy server (Step S604). The message may be routed by the signal routing module (e.g. the signal routing module 315) to the ISP proxy server. After completing the external account registration process, an external account is obtained from the ISP proxy server. When the proxy server is not connected to the external network, or does not have an IP address, or the external register function is not enabled, the external account registration process will be terminated.

According to an embodiment of the invention, the session manager module (e.g. the session manager module 314) is arranged to provide and manage a plurality of internal communication services so that the registered nodes are capable of communicating with each other. To be more specific, for example, the session manager module (e.g. the session manager module 314) may receive one or more internal communication requests from the registered nodes that is planning to communicate with one or more registered nodes other than the requesting one, manage a plurality of session processes to provide corresponding internal communication services for the requesting nodes, and process the control signals regarding the internal communication requests. The control signals may further be routed by the signal routing module (e.g. the signal routing module 315) to the destination node(s).

According to another embodiment of the invention, the session manager module (e.g. the session manager module 314) is arranged to manage the network services provided by the ISP(s) so that the network services are shared between the registered nodes. Note that in the embodiments of the invention, the network nodes that have registered at the proxy server are capable of using the network services provided by the ISP(s) without directly registering with the ISP(s). To be more specific, for example, when the session manager module receives an external outgoing call request from a registered node that is planning to communicate with a target node, outside of the first service network, formed by the plurality of registered nodes via the ISP, the session manager module maps the internal account of the registered node to the external account assigned by the ISP, manages a plurality of session processes for the external outgoing call request and processes the control signals regarding the external outgoing call request. The control signals may further be routed by the signal routing module (e.g. the signal routing module 315) to a corresponding ISP and/or target nodes. On the other hand, when the session manager module receives an incoming call request from a target node, outside of the first service network, that is planning to communicate with a registered node via the ISP, the session manager module maps the external account to the internal account of the registered node, manages a plurality of session processes for the incoming call request and processes the control signals regarding the incoming call request. The control signals may further be routed by the signal routing module (e.g. the signal routing module 315) to the registered node.

According to the embodiments of the invention, besides sharing the network services provided by the ISP(s) between the registered nodes, the session manager module (e.g. the session manager module 314) is further arranged to determine whether to perform multi-media transcoding on the transmitted multi-media data. In the embodiments of the invention, in order to provide expanded internet telephony services with improved quality of service, multi-media transcoding may be selectively performed on the audio and/or video data. According to the embodiments of the invention, the session manager module may determine whether to perform multi-media transcoding on the multi-media data according to channel bandwidth in the first service network and/or the second service network. For example, when different coding schemes are adopted to encode the multi-media data in the first service network and outside of the first service network, when a first coding scheme is adopted by any node to encode multi-media data in the first service network to provide better signal quality and a second coding scheme is adopted by the ISP or any target node, outside of the first service network, to further save bandwidth consumed by transmitting the multi-media data, multi-media transcoding is required.

According to an embodiment of the invention, a multi-media transcoding module (e.g. multi-media transcoding module 316) is arranged to transcode between different coding schemes (e.g. the first and second coding schemes). The multi-media data encoded by the first coding scheme and the second coding scheme may have different bit rates. As an example, the first coding scheme may be a high bit rate coding scheme providing better signal quality than the second coding scheme, or the second coding scheme may be a low bit rate coding scheme requiring fewer channel bandwidth than the first coding scheme. Therefore, a better signal quality inside of the first service network and efficient channel bandwidth utilization inside of the second service network may both be obtained.

Referring back to the data flow shown in the data plane in FIG. 4, in the uplink signal processing path, the multi-media data received from any node in the first service network (such as the LAN/WAN in the left hand side of FIG. 4) may first be processed by unpacking the network header and being decoded from the first coding scheme. After the decoding process, the original raw data may be obtained. The raw data may further be encoded according to the second coding scheme, packed with a network header, and transmitted to the second service network (such as another LAN/WAN in the right hand side of FIG. 4) thereafter. In the downlink signal processing path, the multi-media data received from the ISP or any target node, outside of the first service network, may first be processed by unpacking the network header and being decoded from the second coding scheme. After the decoding process, the original raw data may be obtained. The raw data may further be encoded according to the first coding scheme, packed with the network header, and transmitted to the first service network thereafter. Note that when the first coding scheme adopted in the first service network is the same as the second coding scheme adopted in the other networks, multi-media transcoding steps may be skipped and the multi-media transcoding module may directly bypass the multi-media data as shown in the bypass path in FIG. 4.

Figure 7:
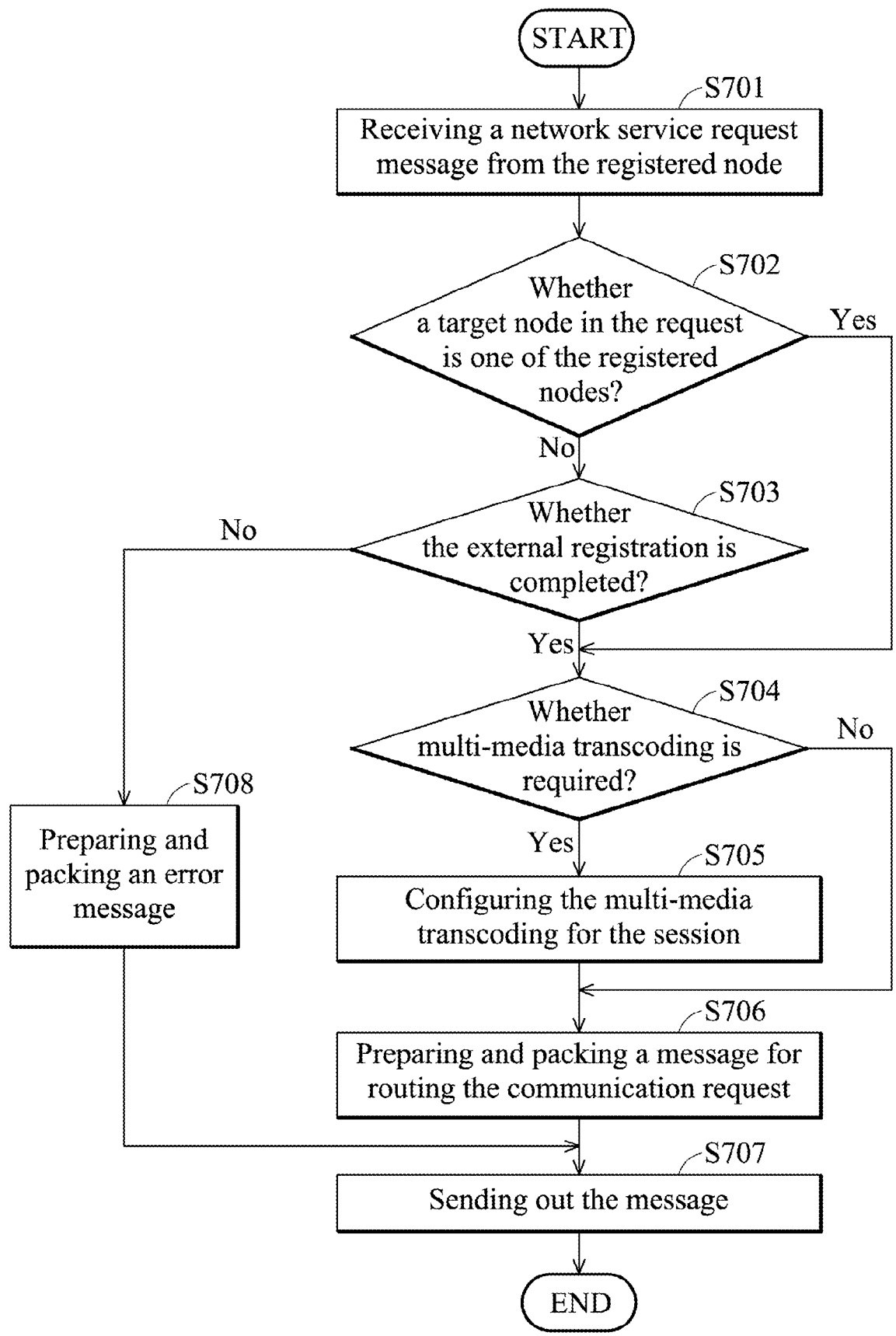
FIG. 7 shows a make call initial flow according to an embodiment of the invention.

FIG. 7 shows a make call initial flow according to an embodiment of the invention. After receiving a network service request message, for example, an internal or external communication request, from the registered node (Step S701), the session manager module may first determine whether a target node in the request is one of the registered nodes (Step S702). The session manager module may check the client information stored in the database 411 to determine whether the target node is one of the registered nodes. When the target node is one of the registered nodes, it means that an internal communication is requested. The session manager module may further determine whether multi-media transcoding is required (Step S704). Alternatively, when the target node is not one of the registered nodes, it means that an external communication has been requested. The session manager module may further check whether the external registration is completed (Step S703). When the external registration is completed, the session manager module may further determine whether multi-media transcoding is required (Step S704). As previously described, the session manager module may determine whether multi-media transcoding is required according to a channel bandwidth. According to another embodiment of the invention, the session manager module may determine whether multi-media transcoding is required according to predetermined configurations. For example, the configurations may be predetermined according to network type. To be more specific, for a network with limited bandwidth, multi-media transcoding may be configured to always be enabled so as to continuously perform translate from the original coding scheme to another one requiring fewer transmission bandwidth. When multi-media transcoding is required, the multi-media transcoding module may configuring the multi-media transcoding for the session (Step S705). After step S705, or when multi-media transcoding is not required, the session manager module may prepare and pack a message to route the communication request in response to the network service request (Step S706), and send out the message to the target node (Step S707). On the other hand, when the external registration is not completed, it means that the external communication service cannot be used. The session manager module may prepare and pack an error message (Step S708), and send out the message to the requesting node (Step S707). The message may be routed by the signal routing module (e.g. the signal routing module 315) to the destination nodes.

According to the embodiments of the invention, the registered nodes (clients) can easily and freely talk with each other on the internet, and are also capable of using the network services provided by one or more ISP(s) without directly registering with the ISP(s). The cost required for using the communication services may be greatly reduced under the proposed mechanism. In addition, via the transcoding scheme, good signal quality and efficient bandwidth utilization may both be obtained between different networks. The proposed mechanisms may be easily implemented in any internet access devices (IADs) so as to provide the expanded internet telephony services with improved quality of service. With internet telephony becoming more and more popular these days, the proposed mechanism can further expand the application of internet telephony services.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A proxy server connected between a first service network and a second service network, comprising:
a system manager, comprising:
an internal registrar module, arranged to provide an internal register service for a plurality of nodes in the first service network, wherein an internal account is assigned to each registered node;
an external registrar module, arranged to register at an internet service provider (ISP) providing a plurality of network services in the second service network, wherein an external account is obtained from the ISP after registering with the ISP;
a session manager module, arranged to manage a plurality of session processes in the first service network and the second service network and manage the network services shared between the registered nodes; and
a signal routing module, arranged to route a plurality of control signals of the session processes between the first service network and the second service network; and
a database, arranged to store information related to the registered nodes.

2. The proxy server as claimed in claim 1, wherein the network services provided by the ISP are shared between the registered nodes via the session manager module so that the registered nodes are capable of using the network services without directly registering with the ISP.

3. The proxy server as claimed in claim 1, wherein the session manager module further provides and manages a plurality of internal communication services so that the registered nodes are capable of communicating with each other.

4. The proxy server as claimed in claim 1, wherein when the session manager module receives an external outgoing call request from a registered node that is planning to communicate with a target node, outside of the first service network, via the ISP, the session manager module maps the internal account of the registered node to the external account, manages a plurality of session processes for the external outgoing call request and processes the control signals regarding the external outgoing call request.

5. The proxy server as claimed in claim 1, wherein when the session manager module receives an incoming call request from a target node, outside of the first service network, that is planning to communicate with a registered node via the ISP, the session manager module maps the external account to the internal account of the registered node, manages a plurality of session processes for the incoming call request and processes the control signals regarding the incoming call request.

6. The proxy server as claimed in claim 1, wherein the system manager further comprises:
a multi-media transcoding module, for transcoding, from a first coding scheme adopted by any node to encode multi-media data in the first service network to a second coding scheme adopted by the ISP or any target node, outside of the first service network, or transcoding, from the second coding scheme adopted by the ISP or any target node, outside of the first service network, to encode multi-media data to the first coding scheme adopted by any node in the first service network.

7. The proxy server as claimed in claim 6, wherein the session manager module further determines whether to perform multi-media transcoding on the multi-media data according to channel bandwidth in the first service network and/or the second service network.

8. The proxy server as claimed in claim 6, wherein the first coding scheme is a high bit rate coding scheme providing better signal quality than the second coding scheme.

9. A computer program product comprising:
non-transitory computer readable medium, having a plurality of computer readable program codes embedded thereon for providing a plurality of proxy server services between a first service network and a second service network, the computer readable program codes comprising:
computer readable program codes for providing an internal register service for a plurality of nodes in the first service network;
computer readable program codes for assigning an internal account to each registered node;
computer readable program codes for registering with an internet service provider (ISP) providing a plurality of network services in the second service network, to thereby obtain an external account from the ISP thereafter;
computer readable program codes for managing the network services to be shared between the registered nodes;
computer readable program codes for managing a plurality of session processes in the first service network and the second service network; and
computer readable program codes for routing a plurality of control signals of the session processes between the first service network and the second service network.

10. The computer program product as claimed in claim 9, wherein the registered nodes are capable of using the network services provided by the ISP without directly registering with the ISP.

11. The computer program product as claimed in claim 9, further comprising:
computer readable program codes for providing and managing a plurality of internal communication services for the registered nodes to communicate with each other.

12. The computer program product as claimed in claim 9, further comprising:
computer readable program codes for processing an external outgoing call request received from a registered node that is planning to communicate with a target node, outside of the first service network, via the ISP;
computer readable program codes for mapping the internal account of the registered node to the external account;
computer readable program codes for managing a plurality of session processes for the external outgoing call request; and
computer readable program codes for processing the control signals regarding the external outgoing call request.

13. The computer program product as claimed in claim 9, further comprising:
computer readable program codes for processing an incoming call request received from a target node, outside of the first service network, that is planning to communicate with a registered node via the ISP;
computer readable program codes for mapping the external account to the internal account of the registered node;
computer readable program codes for managing a plurality of session processes for the incoming call request; and
computer readable program codes for processing the control signals regarding the incoming call request.

14. The computer program product as claimed in claim 9, further comprising:
computer readable program codes for transcoding, between a first coding scheme and a second coding scheme, wherein the first coding scheme is adopted by a registered node to encode multi-media data in the first service network and the second coding scheme is adopted by the ISP or any target node, outside of the first service network, to encode multi-media data.

15. The computer program product as claimed in claim 14, wherein the second coding scheme requires fewer channel bandwidth than the first coding scheme.

16. A method for providing a plurality of internet telephony services by a proxy server connected between a first service network and a second service network comprising:
receiving one or more register requests from one or more nodes in the first service network to register to the proxy server;
processing an internal account register in response to the register requests and assigning an internal account to each registered node;
transmitting an external register message for the proxy server to register at an internet service provider (ISP) providing a plurality of network services in the second service network, and obtaining an external account from the ISP after registering with the ISP;
receiving one or more network service requests from the registered nodes for using the network services provided by the ISP;
managing the internal accounts so as to share the network services between the registered nodes;
managing a plurality of session processes in the first service network and the second service network so as to provide the network services to the requesting registered nodes; and
routing a plurality of control signals of the session processes between the first service network and the second service network.

17. The method as claimed in claim 16, wherein the registered nodes are capable of using the network services provided by the ISP without directly registering with the ISP.

18. The method as claimed in claim 16, further comprising:
receiving one or more internal communication requests from the registered nodes that are planning to communicate with one or more registered nodes other than the requesting one;
managing a plurality of session processes to provide corresponding internal communication services for the requestors; and processing the control signals regarding the internal communication requests.

19. The method as claimed in claim 16, further comprising:

receiving an external outgoing call request from a registered node that is planning to communicate with a target node, outside of the first service network, via the ISP;

mapping the internal account of the registered node to the external account;

managing a plurality of session processes for the external outgoing call request; and processing the control signals regarding the external outgoing call request.

20. The method as claimed in claim 16, further comprising:

receiving an incoming call request from a target node, outside of the first service network, that is planning to communicate with a registered node via the ISP;

mapping the external account to the internal account of the registered node;

managing a plurality of session processes for the incoming call request; and processing the control signals regarding the incoming call request.

21. The method as claimed in claim 16, further comprising:

transcoding, between a first coding scheme and a second coding scheme, wherein the first coding scheme is adopted by a registered node to encode multi-media data in the first service network and the second coding scheme is adopted by the ISP or any target node, outside of the first service network, to encode multi-media data.

22. The method as claimed in claim 21, wherein the multi-media data encoded by first coding scheme and the multi-media data encoded by the second coding scheme have different bit rates.

* * * * *